United States Patent
Hexsel et al.

(10) Patent No.: US 12,298,395 B2
(45) Date of Patent: *May 13, 2025

(54) VELOCITY ESTIMATION USING DOPPLER PER POINT LIDAR SYSTEMS

(71) Applicant: AEVA, INC., Mountain View, CA (US)

(72) Inventors: Bruno Hexsel, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,808

(22) Filed: Nov. 14, 2023

(65) Prior Publication Data
US 2024/0077614 A1 Mar. 7, 2024

Related U.S. Application Data

(63) Continuation of application No. 16/353,255, filed on Mar. 14, 2019, now Pat. No. 11,828,848.

(51) Int. Cl.
*G01S 17/58* (2006.01)
*G01S 7/48* (2006.01)
*G01S 17/89* (2020.01)

(52) U.S. Cl.
CPC .......... *G01S 17/58* (2013.01); *G01S 7/4808* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 8,755,997 B2 | 6/2014 | Au et al. | |
| 11,002,856 B2 | 5/2021 | Heidrich et al. | |
| 11,046,328 B2 | 6/2021 | Tirer et al. | |
| 2010/0074532 A1* | 3/2010 | Gordon | G06V 10/145 382/203 |
| 2010/0271615 A1* | 10/2010 | Sebastian | G06T 7/74 356/28 |
| 2015/0198711 A1 | 7/2015 | Zeng et al. | |
| 2018/0188027 A1 | 7/2018 | Zhang et al. | |
| 2018/0232947 A1 | 8/2018 | Nehmadi et al. | |
| 2018/0335787 A1 | 11/2018 | Zeng et al. | |
| 2019/0317219 A1 | 10/2019 | Smith et al. | |
| 2019/0369222 A1* | 12/2019 | Oh | G01S 13/931 |
| 2020/0132850 A1 | 4/2020 | Crouch et al. | |
| 2020/0150274 A1* | 5/2020 | Belsley | G01S 17/87 |

* cited by examiner

*Primary Examiner* — Luke D Ratcliffe
*Assistant Examiner* — Jempson Noel
(74) *Attorney, Agent, or Firm* — Womble Bond Dickinson (US) LLP

(57) ABSTRACT

A method of operating a light detection and ranging (LiDAR) system is provided that includes performing a scene measurement using a LiDAR sensor capable of measuring Doppler per point. The method also includes estimating a velocity of the LiDAR sensor with respect to static points within the scene based on the scene measurement. The method may also include compensating for the velocity of the LiDAR sensor and compensating for a Doppler velocity of the LiDAR sensor.

20 Claims, 6 Drawing Sheets

VELOCITY ESTIMATION USING DOPPLER PER POINT LIDAR SYSTEMS

CROSS-REFERENCE TO RELATED APPLICATION(S)

This application is a continuation of U.S. patent application Ser. No. 16/353,255, filed Mar. 14, 2019, the entire contents of which are incorporated herein by reference in its entirety.

TECHNICAL FIELD

The present disclosure relates generally to calculating velocity using a Doppler per point light detection and ranging (LiDAR) system.

BACKGROUND

Traditional LiDAR systems operate by sending pulses toward a target and measuring the time the pulses take to reach the target and return. In such time-of-flight systems, the user learns information about the distance to the object, which when coupled with a scanner can provide a 3-D point cloud of the sensor's field-of-view.

SUMMARY

The present disclosure includes, without limitation, the following example implementations.

Some example implementations provide a method of operating a light detection and ranging (LiDAR) system. The method includes performing a scene measurement using a LiDAR sensor capable of measuring Doppler per point; and estimating a velocity of the LiDAR sensor with respect to static points within the scene based on the scene measurement. In some embodiments, the velocity of the LiDAR sensor is estimated without identification of landmarks within the scene. In some embodiments, the method also includes compensating for the velocity of the LiDAR sensor by applying a transform to each point in the scene measurement to provide a displacement of the LiDAR sensor with respect to a moving reference frame; and compensating for a Doppler velocity of the LiDAR sensor to generate a Doppler measurement of each point in the scene measurement from a static reference frame. In some embodiments, the method also includes determining static points within the scene measurement based on a comparison of points within a Doppler point cloud, and wherein the velocity of the LiDAR sensor is estimated based on the determined static points within the point cloud. In some embodiments, performing the scene measurement includes performing at least one sample period of a LiDAR sensor. In some embodiments, performing the scene measurement includes performing at least one sample period of at least two LiDAR sensors. In some embodiments, at least two LiDAR sensors allow estimation of the velocity of the LiDAR sensors in up to six degrees of freedom. In some embodiments, performing the scene measurement generates a 3D displacement of points in the scene, a Doppler velocity estimate of the points in the scene, and a timestamp.

Additional example implementations provide a method of operating a light detection and ranging (LiDAR) system including performing a scene measurement using a Doppler per point LiDAR sensor to generate a set of Cartesian location measurements and Doppler velocity measurements; and estimating translational and rotational movement of the LiDAR sensor with respect to static points within the scene based on the location measurements and Doppler velocity measurements. In some embodiments, the translational and rotational movement of the LiDAR sensor is estimated independent of identification of landmarks within the scene. In some embodiments, the method also includes determining static points within the scene measurement, and wherein the translational and rotational movement of the LiDAR sensor is estimated based on the determined static points. In some embodiments, determining static points within the scene measurement includes performing a random sample and consensus (RANSAC) algorithm in which a majority of points in the scene are assumed to be static. In some embodiments, performing a scene measurement includes performing at least one sample period of a LiDAR sensor.

Additional example implementations provide a non-transitory computer-readable storage medium including instructions that, when executed by a processing device, cause the processing device to perform a scene measurement using a LiDAR sensor capable of measuring Doppler per point; estimate, by the processing device, a velocity of the LiDAR sensor with respect to static points within the scene based on the scene measurement; and determine static points within the scene measurement based on a comparison of points within a Doppler point cloud, and wherein the velocity of the LiDAR sensor is estimated based on the determined static points within the point cloud. In some embodiments, the instructions further cause the processing device to compensate for the velocity of the LiDAR sensor by applying a transform to each point in the scene measurement to provide a displacement of the LiDAR sensor with respect to a moving reference frame; and compensate for a Doppler velocity of the LiDAR sensor to generate a Doppler measurement of each point in the scene measurement from a static reference frame. In some embodiments, the velocity of the LiDAR sensor is estimated independent of identification of landmarks within the scene. In some embodiments, the instructions further cause the processing device to perform at least one sample period of a LiDAR sensor. In some embodiments, the instructions further cause the processing device to perform the scene measurement by performing at least one sample period of at least two LiDAR sensors. In some embodiments, the at least two LiDAR sensors allow estimation of the velocity of the LiDAR sensor in up to six degrees of freedom. In some embodiments, the scene measurement includes a 3D displacement of points in the scene, a Doppler velocity estimate of the points in the scene, and a timestamp.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
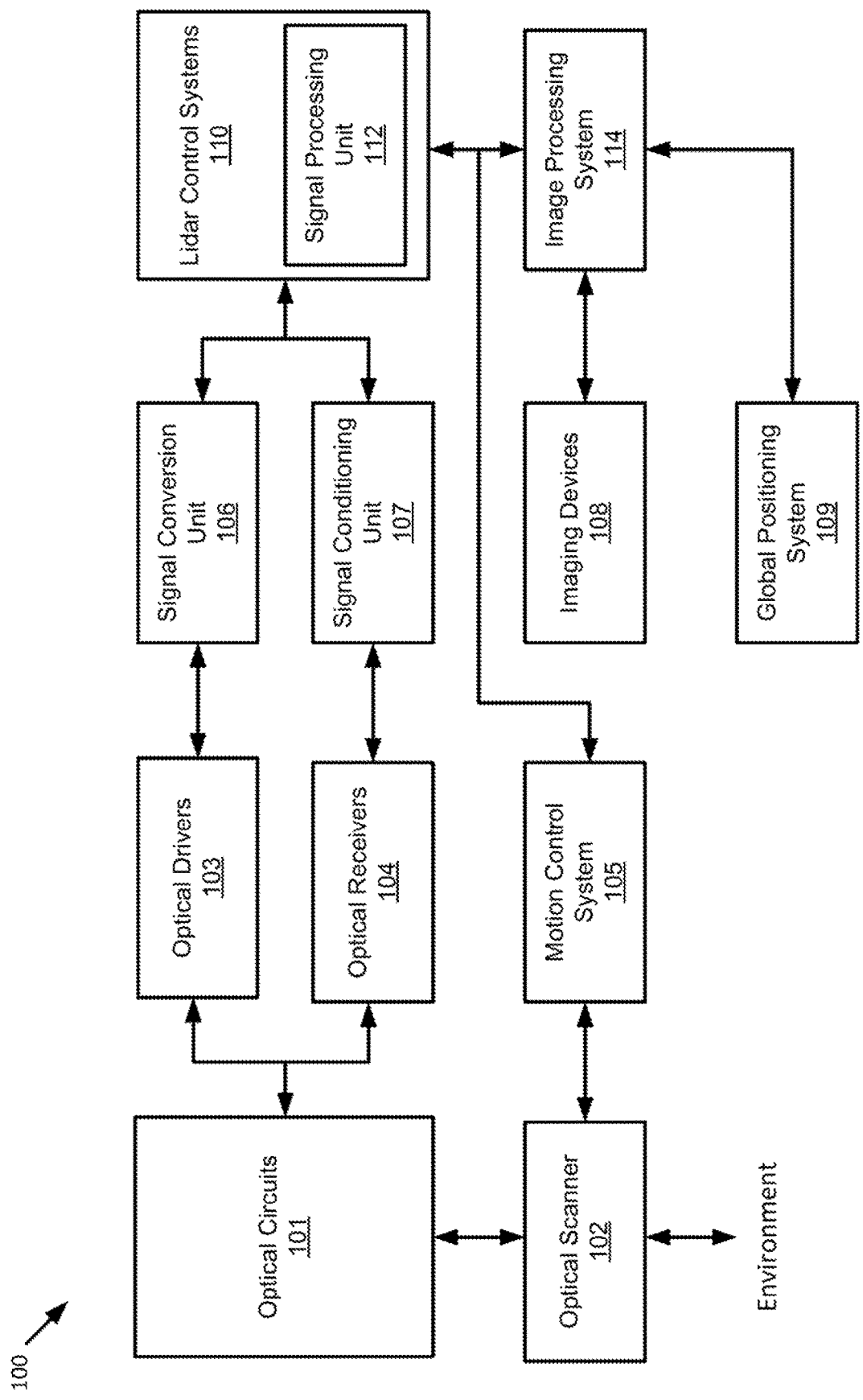
FIG. 1 illustrates a LiDAR system according to example implementations of the present disclosure.

Example implementations of the present disclosure are directed to an improved scanning LiDAR system. Example implementations of the present disclosure are based on a type of LiDAR that uses a LiDAR sensor capable of measuring Doppler per point to estimate motion. Most traditional Time-of-Flight (TOF) LiDAR systems require multiple sequential samples of points to estimate motion, or require a comparison against prior maps of a scene. According to example embodiments of the present technology, a Doppler per point LiDAR allows motion to be estimated directly from a single sample of points. Furthermore, the association of landmarks in TOF systems requires inference and is error-prone, whereas the method described herein does not require landmark association and the motion estimation is done purely with directly measured data.

Example implementations of the present disclosure are configured to estimate the motion of a rigid body using directly measured data from a Doppler per point LiDAR system. The techniques described herein can use a set of Cartesian points obtained by the LiDAR system, along with Doppler velocity readings, to estimate translational and rotational components of motion with respect to static elements of the environment. This method can be used for positioning and detection purposes. Examples of final applications may include vehicle velocity and displacement estimation and estimation of moving objects in a scene.

According to exemplary embodiments, the movement of a Doppler per point LiDAR sensor, or the movement of a rigid body on which the LiDAR sensor is mounted, can be estimated based on directly measured data. A LiDAR sensor capable of measuring Doppler per point can perform a scene measurement in order to generate a Doppler point cloud of a scene, and the velocity of the Doppler per point LiDAR sensor can be estimated based on this data. The Doppler point cloud can include, for example, a set of points containing the 3D displacement of each point with respect to the LiDAR system and velocity components. Timestamps can also be associated with each data point in the Doppler point cloud, as well as light intensity, which is the amount of light that returns for each sample. In some embodiments, color coding can be assigned to points within the point cloud to indicate the direction of motion of each point (e.g., whether an object is moving toward or away from the user or the sensor). In alternative embodiments, points can be color coded based on their height with respect to the ground. In some embodiments, a set of static points within the scene can be determined, and the movement of the LiDAR sensor can be estimated based on a comparison with the static points in the environment. Once the velocity of the LiDAR sensor has been determined, the system can compensate for the velocity of the LiDAR sensor, as well as the Doppler velocity of the LiDAR sensor with respect to moving elements within the scene and with respect to a static frame of reference. In this way, a corrected or compensated Doppler point cloud can be generated that indicates the movements of objects within a scene with respect to a static frame of reference.

FIG. 1 illustrates a LiDAR system 100 according to example implementations of the present disclosure. The LiDAR system 100 includes one or more of each of a number of components, but may include fewer or additional components than shown in FIG. 1. The LiDAR system 100 may be implemented in any sensing market, such as, but not limited to, transportation, manufacturing, metrology, medical, and security systems. For example, in the automotive industry, the described beam delivery system becomes the front-end of FMCW devices that can assist with spatial awareness for automated driver assist systems, or self-driving vehicles. As shown, the LiDAR system 100 includes optical circuits 101. The optical circuits 101 may include a combination of active optical components and passive optical components. Active optical components may generate, amplify, or detect optical signals and the like. In some examples, the active optical circuit includes lasers at different wavelengths, one or more optical amplifiers, one or more optical detectors, or the like.

Passive optical circuits may include one or more optical fibers to carry optical signals, and route and manipulate optical signals to appropriate input/output ports of the active optical circuit. The passive optical circuits may also include one or more fiber components such as taps, wavelength division multiplexers, splitters/combiners, polarization beam splitters, collimators or the like. In some embodiments, as discussed further below, the passive optical circuits may include components to transform the polarization state and direct received polarized light to optical detectors using a polarizing beam splitter.

An optical scanner 102 includes one or more scanning mirrors that are rotatable along respective orthogonal axes to steer optical signals to scan an environment according to a scanning pattern. For instance, the scanning mirrors may be rotatable by one or more galvanometers. The optical scanner 102 also collects light incident upon any objects in the environment into a return laser beam that is returned to the passive optical circuit component of the optical circuits 101. For example, the return laser beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LiDAR system 100 includes a LiDAR control systems 110. The LiDAR control systems 110 may include a processing device for the LiDAR system 100. In embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LiDAR control systems 110 may include a signal processing unit 112 such as a digital signal processor. The LiDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some embodiments, a motion control system 105 may also return information to the LiDAR control systems 110 about the position or operation of components of the optical scanner 102. For example, an analog-to-digital converter may in turn convert information about the galvanometers' position to a signal interpretable by the LiDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LiDAR control systems 110. The optical receivers 104 may be in communication with a signal conditioning unit 107, in some embodiments. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110.

In some applications, the LiDAR system 100 may additionally include one or more imaging devices 108 configured to capture images of the environment, a global positioning system 109 configured to provide a geographic location of the system, or other sensor inputs. In alternative embodiments, an inertial measurement unit (IMU) can be used in addition to or instead of the GPS. The LiDAR system 100 may also include an image processing system 114. The image processing system 114 can be configured to receive the images and geographic location, and send the images and location or information related thereto to the LiDAR control systems 110 or other systems connected to the LiDAR system 100.

In operation according to some examples, the LiDAR system 100 is configured to use nondegenerate laser sources to simultaneously measure range and velocity across two dimensions. This capability allows for real-time, long range measurements of range, velocity, azimuth, and elevation of the surrounding environment. In some example implementations, the system points multiple modulated laser beams to the same target.

In some examples, the scanning process begins with the optical drivers 103 and LiDAR control systems 110. The LiDAR control systems 110 instruct the optical drivers 103 to independently modulate one or more lasers, and these modulated signals propagate through the passive optical circuit to the collimator. The collimator directs the light at the optical scanning system that scans the environment over a preprogrammed pattern defined by the motion control subsystem. The optical circuits may also include a polarization wave plate to transform the polarization of the light as it leaves the optical circuits 101. In embodiments, the polarization wave plate may be a quarter-wave plate or a half-wave plate. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
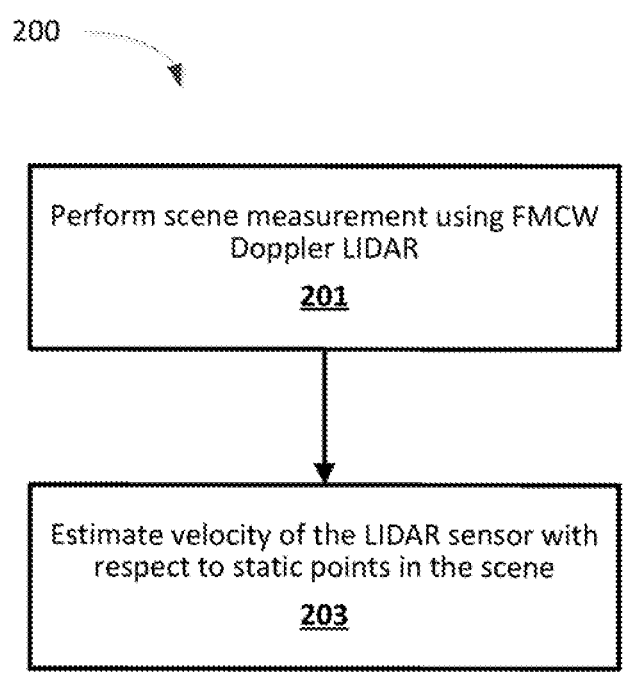
FIG. 2 depicts a flow diagram of a method for performing motion estimation in accordance with example implementations of the present disclosure.

FIG. 2 illustrates a flow chart of an example method 200 for performing motion estimation in accordance with example implementations of the present disclosure. In embodiments, various portions of method 200 may be performed by LiDAR system of FIG. 1. With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

At block 201, a LiDAR sensor capable of measuring Doppler per point performs a scene measurement. In exemplary embodiments, the Doppler per point LiDAR system samples a point cloud of the environment for an interval of time. This interval of time can be arbitrary, but should contain a variety of directional readings. For example, a sample could be one sample period of a LiDAR sensor, such as a 360-degree rotating LiDAR. The point cloud sample contains, in some embodiments, the 3D displacement of the points, a Doppler velocity estimate of the environment, and a timestamp of the readings. Planar 2D LiDAR systems could also be used to collect a point cloud sample, in some embodiments.

At block 203, the velocity of the LiDAR sensor, or the rigid body on which the sensor is mounted, is estimated with respect to static points within the scene based on the scene measurement. In exemplary embodiments, the velocity of the LiDAR sensor is estimated without identification of landmarks within the scene and without the need to compare sequential measurements of the scene. For example, the algorithm can determine which elements or points within the scene are static, and then estimate how fast the static elements are moving with respect to the LiDAR system.

Figure 3:
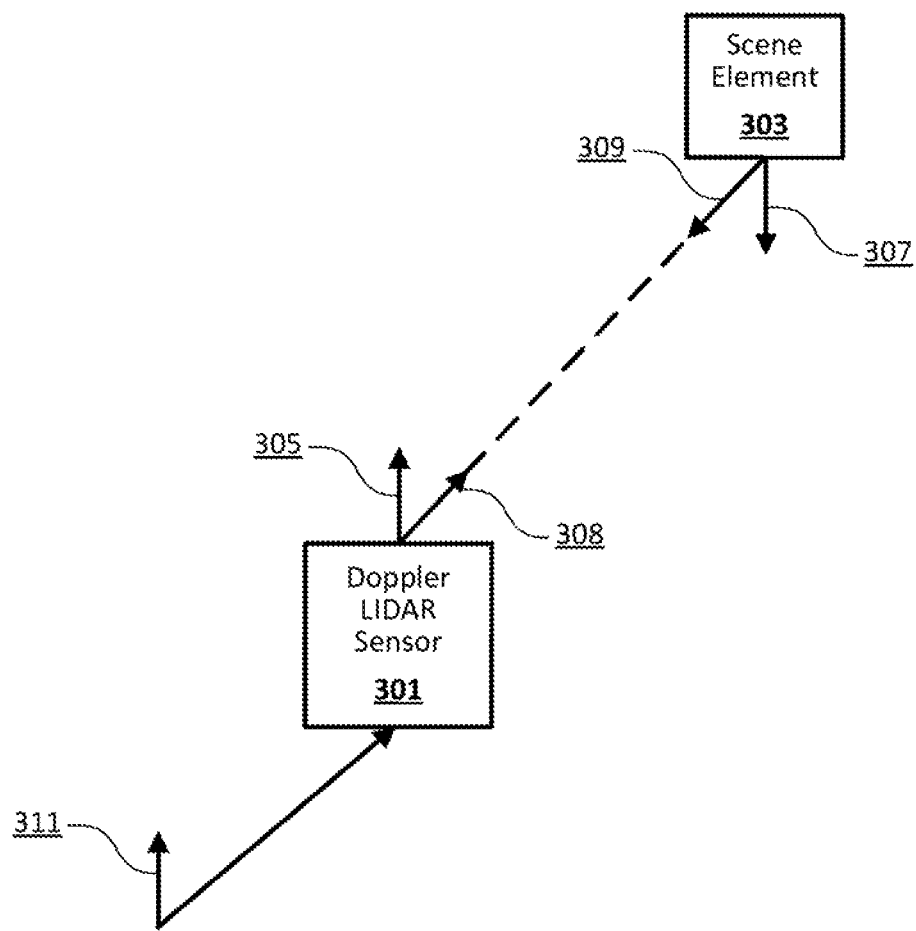
FIG. 3 illustrates a velocity measurement using a Doppler per point LiDAR system according to example implementations of the present disclosure.

FIG. 3 illustrates a velocity measurement using a Doppler per point LiDAR system according to example implementations of the present disclosure. In this example embodiment, a Doppler per point LiDAR sensor 301 is mounted on a rigid body, such as a vehicle or a drone, and is in motion. The sensor 301 transmits a beam of light to a scene element 303. The velocity of the LiDAR sensor 301 with respect to a fixed frame is graphically illustrated as 305, and the static measurement of the velocity of the scene element 303 with respect to the Doppler per point LiDAR sensor 301 is illustrated as 307. The projected radial velocity along the reading direction of the sensor 301 (i.e., the Doppler reading) is illustrated as 309. By performing a transform between the reference and the LiDAR sensor 301, one can estimate the velocity of the sensor 301 with respect to a fixed frame, which velocity is illustrated as 311.

In exemplary embodiments, the i-th range measurement is defined as a Cartesian vector representing the displacement of the point with respect to the LiDAR sensor. This Cartesian vector can be characterized by equation (1).

$$r_i = [x_i, y_i, z_i]^T \quad (1)$$

The reading direction unit vector 313 can be characterized by equation (2). In some embodiments, the orientation of the frame of measurement may be irrelevant if all the vectors are consistent.

$$d_i = r_i / |r_i| \quad (2)$$

The LiDAR velocity with respect to the static or fixed frame, illustrated in FIG. 3 as 305, is what is being solved for or estimated. This velocity can be characterized by equation (3), below.

$$v = [v_x, v_y, v_z]^T \quad (3)$$

For each static measurement in the scene, the expected Doppler velocity measurement is the negative of the rigid body speed projected along the reading direction. This static measurement can be characterized by equation (4), where m is the Doppler velocity reading for each point.

$$\hat{m} = -d_i \cdot v \quad (4)$$

Because the goal is to solve for the velocity, it is beneficial to find the minimum error for a given set of points. An example of a function to minimize this error for a set of static points P is shown in equation (5) below. One skilled in the art will appreciate that other objective functions for this minimization can be used.

$$v^* = \operatorname{argmin}_v \Sigma_{p \in P} \| \hat{m}_p - m_p \| \quad (5)$$

An example optimization method for finding the optimal LiDAR velocity v* is Least-Squares estimation. One skilled in the art will realize that multiple LiDARs can be used in this formulation, although the point of reference of the static measurements may change and kinematic rules would be applied.

In exemplary embodiments, the static velocity measurement with respect to the Doppler per point LiDAR sensor, illustrated as 307, can be calculated. Identifying the set of static points P within the scene can be challenging. In one example embodiment, a prior estimate of the static environment can be used, for example in a vehicle where the road plane is at a known position. In an alternative embodiment, a random sample and consensus (RANSAC) algorithm, or other type of random sampling algorithms can be used. In the random sampling case, the LiDAR system can assume that a majority of points in a scene are static, and the rigid body velocity of the LiDAR sensor can be estimated where most of the points in the scene have zero velocity. An example of this algorithm can be characterized by equations (6) and (7) below, where V is the set of candidate estimated motions from a random sample of points P, and where $m_{threshold}$ is a threshold static velocity to determine if the point is static or not.

$$v^* = \max_{v \in V} \Sigma_i \operatorname{INLIER}(d_p, v) \quad (6)$$

$$\operatorname{INLIER}(d, v) = 1_{|m_i - (-d \cdot v)| < m_{threshold}} \quad (7)$$

In some example embodiments, in order to minimize the influence of close moving objects that may receive a large number of readings, a spatial decimation of points can be implemented so that points are distributed uniformly throughout the scene. This process is known as voxelization.

Figure 4:
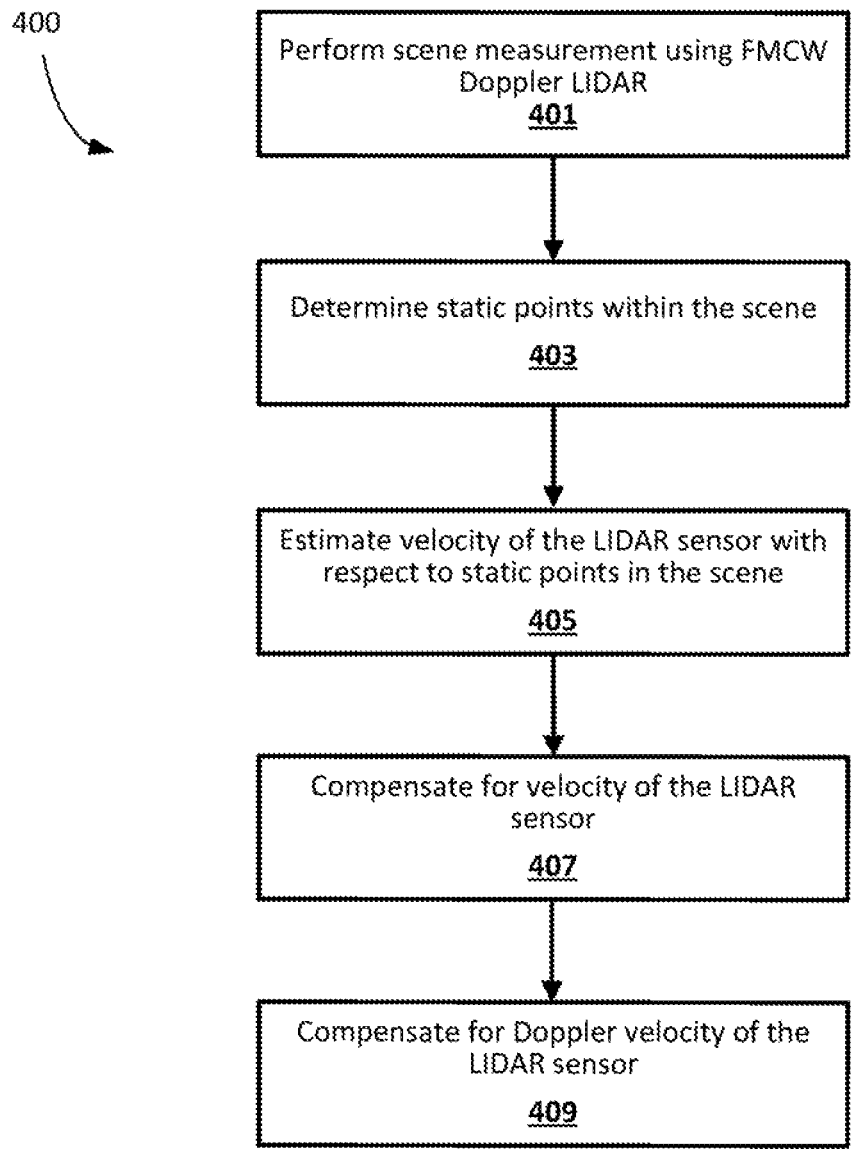
FIG. 4 depicts a flow diagram of another method for performing motion estimation in accordance with example implementations of the present disclosure.

FIG. 4 illustrates a flow chart of an example method 400 for performing motion estimation in accordance with example implementations of the present disclosure. In embodiments, various portions of method 400 may be performed by LiDAR system of FIG. 1. With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

At block 401, a Doppler per point LiDAR sensor capable of measuring Doppler per point performs a scene measurement. In exemplary embodiments, the Doppler per point LiDAR system samples a point cloud of the environment for an interval of time. This interval of time can be arbitrary, but should contain a variety of directional readings. For example, a sample could be one sample period of a rotating LiDAR. The point cloud sample contains, in some embodiments, the 3D displacement of the points, a Doppler velocity estimate of the environment, and a timestamp of the readings. Planar 2D LiDAR systems could also be used to collect a point cloud sample, in some embodiments.

At block 403, static points within the scene are determined based on a comparison of points within the Doppler point cloud. In exemplary embodiments, the velocity of the LiDAR sensor is estimated based on the determined static points within the Doppler point cloud. In some embodiments, the static points within the scene are determined using a RANSAC algorithm in which a majority of points in the scene are assumed to be static. In alternative embodiments, determining the static points within the scene includes performing a comparison between the sampled scene and a prior estimation or measurement of the scene. The prior estimation of the scene may be stored in a database, for example, and compared against scene measurement data generated by the LiDAR sensor.

At block 405, the velocity of the LiDAR sensor, or the rigid body on which the sensor is mounted, is estimated with respect to static points within the scene based on the scene measurement. In exemplary embodiments, the velocity of the LiDAR sensor is estimated without identification of landmarks within the scene and without the need to compare sequential measurements of the scene. For example, the algorithm can determine which elements or points within the scene are static, and then estimate how fast the static elements are moving with respect to the LiDAR system.

At block 407, the velocity of the LiDAR sensor is compensated for. In exemplary embodiments, the velocity of the LiDAR sensor can be compensated for by applying a transform to each point in the scene measurement to provide a displacement of the LiDAR sensor with respect to a moving reference frame. In this way, the Doppler point cloud generated by the Doppler per point LiDAR sensor during scene measurement can be corrected for the movement of the LiDAR sensor itself while it was sampling the environment during a period of time. If not corrected, straight objects in a scene like light poles would appear deformed. After compensating for or correcting the point cloud, a straight object like a light pole would appear straight.

Once the velocity of the LiDAR (or LiDARs) has been estimated, the linear and angular reference point velocities can be estimated based on the velocity measurement. This can be performed, for example, by applying kinematic equations to determine the reference point velocity given the estimated LiDAR velocity. In a vehicle, for example, the reference point is usually the center of the rear axle. The reference point velocity can be estimated up to three degrees of freedom for a single Doppler per point LiDAR sensor. In some example embodiments, up to six degrees of freedom can be achieved using two or more Doppler per point LiDARs. Other sensors can be added to enhance the rigid motion estimation such as gyroscopes and accelerometers. In alternative embodiments of the present disclosure, it may be possible to obtain up to six degrees of freedom from a single LiDAR sensor by using the Cartesian point cloud itself between frames.

To compensate for the LiDAR motion, the estimated reference point motion can be integrated from the estimated linear and angular velocities obtained by the LiDAR. The estimation of the motion of the rigid body through integration can depend on the physics of the rigid body. For instance, a land vehicle can be modeled with a simple two degrees-of-freedom model, whereas an unmanned aerial vehicle may have full six degrees-of-freedom movement. Each point in the Doppler point cloud can then be corrected by applying a rigid transform to provide the displacement of the LiDAR with respect to the moving reference frame according to equation (8), where $T(\Delta T, v)$ is the transform from the integrated motion from the estimated velocity v and the amount of time $\Delta T_i$ when the point $p_i$ was measured.

$$p_i^{comp} = T(\Delta T_i, v) \cdot p_i \tag{8}$$

At block 409, the Doppler velocity of the LiDAR sensor is compensated for to generate a Doppler measurement of each point in the scene from a static reference frame. In this block, the motion of the LiDAR sensor is compensated by determining the amount of Doppler velocity measurement that is caused by the movement of the sensor (i.e., the movement of the rigid body on which the sensor is mounted). In an exemplary embodiment, the output of this step is a point cloud where points that are moving are easily identifiable, and the point velocity with respect to the ground can be promptly estimated. This compensated Doppler velocity can be characterized by equation (9).

$$m_i^{comp} = m_i - (-d_i \cdot v) \tag{9}$$

In exemplary embodiments, the compensated Doppler point cloud can be indicated, for example using a color coding, whether elements in the scene are moving toward or away from the LiDAR sensor with respect to the ground, even if the elements are moving parallel to the LiDAR sensor at a similar or substantially equal speed. Using such a system, the ground speed of the LiDAR sensor, and other elements in the scene, can be detected, segmented, and estimated.

Figure 5:
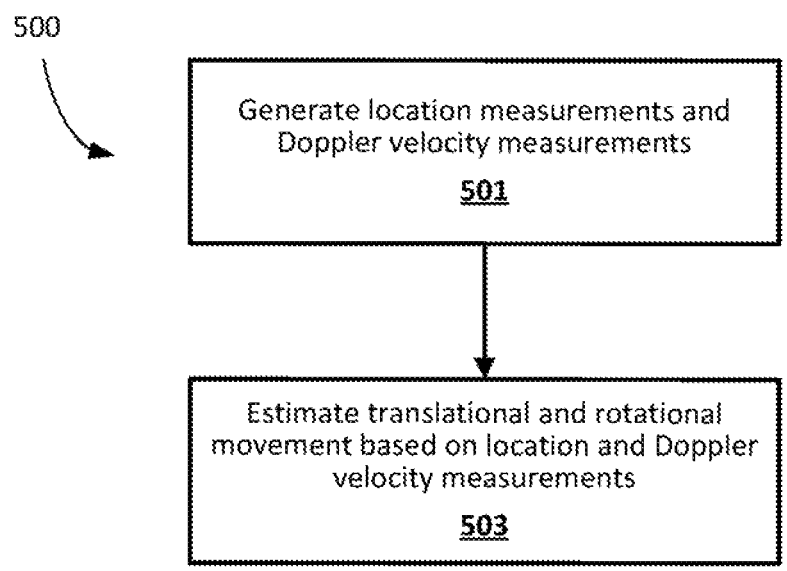
FIG. 5 depicts a flow diagram of another method for performing motion estimation in accordance with example implementations of the present disclosure.

FIG. 5 illustrates a flow chart of another example method 500 for performing motion estimation in accordance with example implementations of the present disclosure. In embodiments, various portions of method 500 may be performed by LiDAR system of FIG. 1. With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

At block 501, a Doppler per point LiDAR sensor capable of measuring Doppler per point performs a scene measurement. In exemplary embodiments, the Doppler per point LiDAR system samples a point cloud of the environment for an interval of time and generates a set of Cartesian location measurements and Doppler velocity measurements. In some embodiments, measuring the scene includes performing one sample period of a LiDAR sensor.

At block 503, the translational and rotational movement of the LiDAR sensor is estimated with respect to static points within the scene based on the Cartesian location measurements and the Doppler velocity measurements. In exemplary embodiments, the translational and rotational movement of the LiDAR sensor is estimated independent of identification of landmarks within the scene. The movement of the LiDAR sensor can be determined, in some embodiments, based on a comparison with static points within the scene. The static points within the scene can be determined, for example, using a RANSAC algorithm in which a majority of points in the scene are assumed to be static, or based on a prior estimation of the scene.

Figure 6:
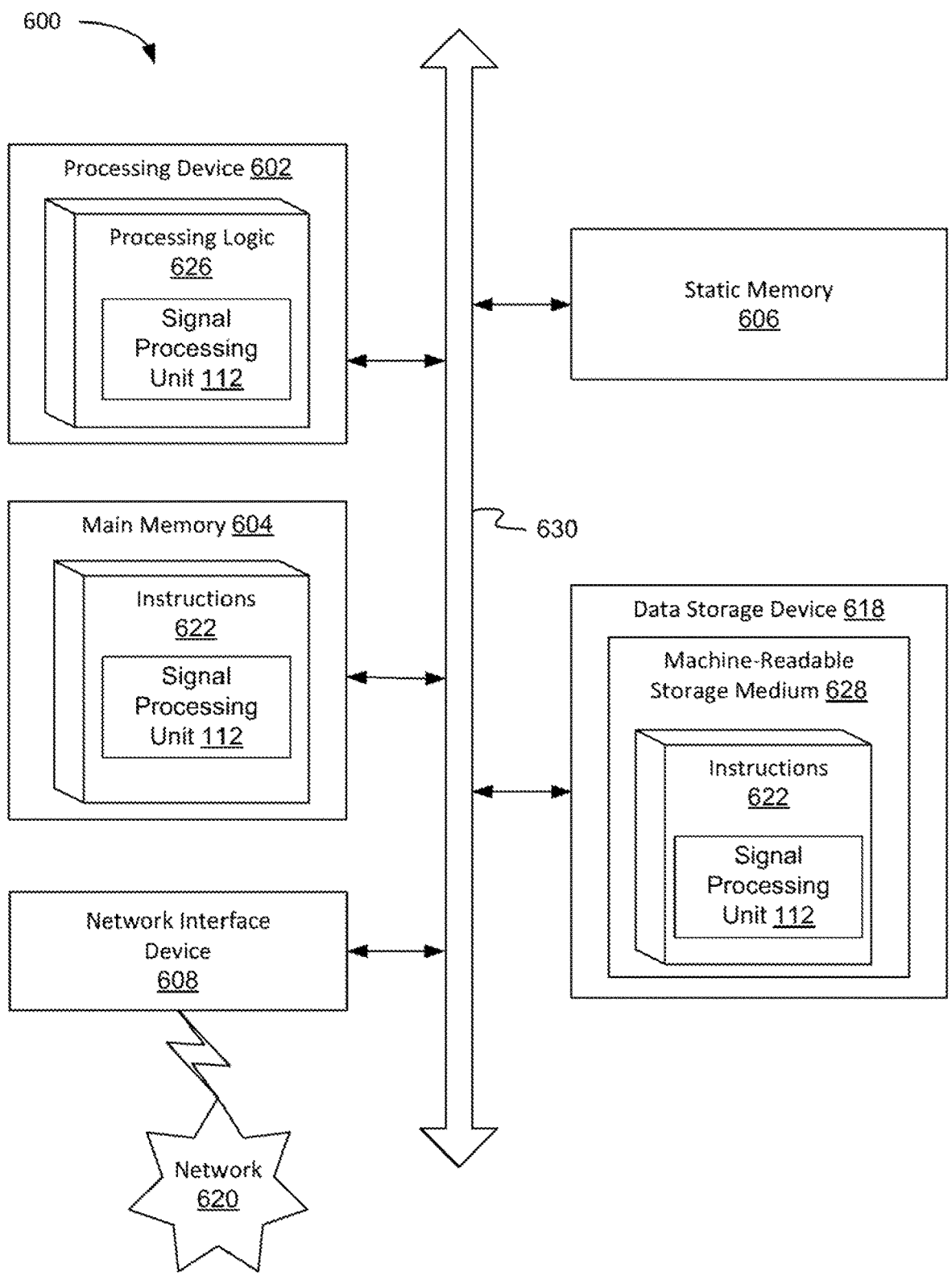
FIG. 6 is a block diagram of an example apparatus that may perform one or more of the operations described herein, in accordance with some embodiments.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of the signal processing unit 112 of FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute the signal processing unit 112. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform the signal processing unit 112 of FIG. 1, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of operating a light detection and ranging (LiDAR) system comprising:
    performing a scene measurement of a scene to generate a first point cloud using a LiDAR sensor capable of measuring Doppler per point;
    estimating a velocity of the LiDAR sensor with respect to static points within the scene based on the scene measurement; and
    compensating respective points of the first point cloud for a Doppler velocity of the LiDAR sensor to generate a second corrected point cloud comprising a Doppler measurement of each respective point in the first point cloud in the scene measurement from a static reference frame.

2. The method of claim 1, wherein the velocity of the LiDAR sensor is estimated without identification of landmarks within the scene.

3. The method of claim 1, further comprising:
    compensating for the velocity of the LiDAR sensor by applying a transform to each point in the scene measurement to provide a displacement of the LiDAR sensor with respect to a moving reference frame.

4. The method of claim 1, further comprising:
    determining the static points within the scene measurement based on a comparison of points within a Doppler point cloud, and wherein the velocity of the LiDAR sensor is estimated based on the determined static points within the Doppler point cloud.

5. The method of claim 1, wherein performing the scene measurement includes performing at least one sample period of the LiDAR sensor.

6. The method of claim 1, wherein performing the scene measurement includes performing at least one sample period of at least two LiDAR sensors.

7. The method of claim 6, wherein the at least two LiDAR sensors allow estimation of the velocity of the at least two LiDAR sensors in up to six degrees of freedom.

8. The method of claim 1, wherein performing the scene measurement generates a 3D displacement of points in the scene, a Doppler velocity estimate of the points in the scene, and a timestamp.

9. A method of operating a light detection and ranging (LiDAR) system comprising:
    performing a scene measurement of a scene to generate a first point cloud using a Doppler per point LiDAR sensor to generate a set of Cartesian location measurements and Doppler velocity measurements;
    estimating translational and rotational movement of the Doppler per point LiDAR sensor with respect to static points within the scene based on the set of Cartesian location measurements and Doppler velocity measurements; and
    compensating respective points of the first point cloud for a Doppler velocity of the Doppler per point LiDAR sensor to generate a second corrected point cloud comprising a Doppler measurement of each respective point in the first point cloud in the scene measurement from a static reference frame.

10. The method of claim 9, wherein the translational and rotational movement of the Doppler per point LiDAR sensor is estimated independent of identification of landmarks within the scene.

11. The method of claim 9, further comprising:
    determining the static points within the scene measurement, and wherein the translational and rotational movement of the Doppler per point LiDAR sensor is estimated based on the determined static points.

12. The method of claim 11, wherein determining the static points within the scene measurement includes performing a random sample and consensus (RANSAC) algorithm in which a majority of points in the scene are assumed to be static.

13. The method of claim 9, wherein performing the scene measurement includes performing at least one sample period of a LiDAR sensor.

14. A non-transitory computer-readable storage medium including instructions that, when executed by a processing device, cause the processing device to:
    perform a scene measurement of a scene to generate a first point cloud using a LiDAR sensor capable of measuring Doppler per point;
    estimate, by the processing device, a velocity of the LiDAR sensor with respect to static points within the scene based on the scene measurement;
    determine the static points within the scene measurement based on a comparison of points within a Doppler point cloud, and wherein the velocity of the LiDAR sensor is estimated based on the determined static points within the Doppler point cloud; and
    compensate respective points of the first point cloud for a Doppler velocity of the LiDAR sensor to generate a second corrected point cloud comprising a Doppler measurement of each respective point in the first point cloud in the scene measurement from a static reference frame.

15. The non-transitory computer-readable storage medium of claim 14, wherein the instructions, when executed by the processing device, further cause the processing device to:
    compensate for the velocity of the LiDAR sensor by applying a transform to each point in the scene measurement to provide a displacement of the LiDAR sensor with respect to a moving reference frame.

16. The non-transitory computer-readable storage medium of claim 14, wherein the velocity of the LiDAR sensor is estimated independent of identification of landmarks within the scene.

17. The non-transitory computer-readable storage medium of claim 14, wherein the instructions, when executed by the processing device, further cause the processing device to:
perform at least one sample period of the LiDAR sensor.

18. The non-transitory computer-readable storage medium of claim 14, wherein the instructions, when executed by the processing device, further cause the processing device to:
perform the scene measurement by performing at least one sample period of at least two LiDAR sensors.

19. The non-transitory computer-readable storage medium of claim 18, wherein the at least two LiDAR sensors allow estimation of the velocity of the LiDAR sensor in up to six degrees of freedom.

20. The non-transitory computer-readable storage medium of claim 14, wherein the scene measurement includes a 3D displacement of points in the scene, a Doppler velocity estimate of the points in the scene, and a timestamp.

\* \* \* \* \*